Patented Mar. 6, 1923.

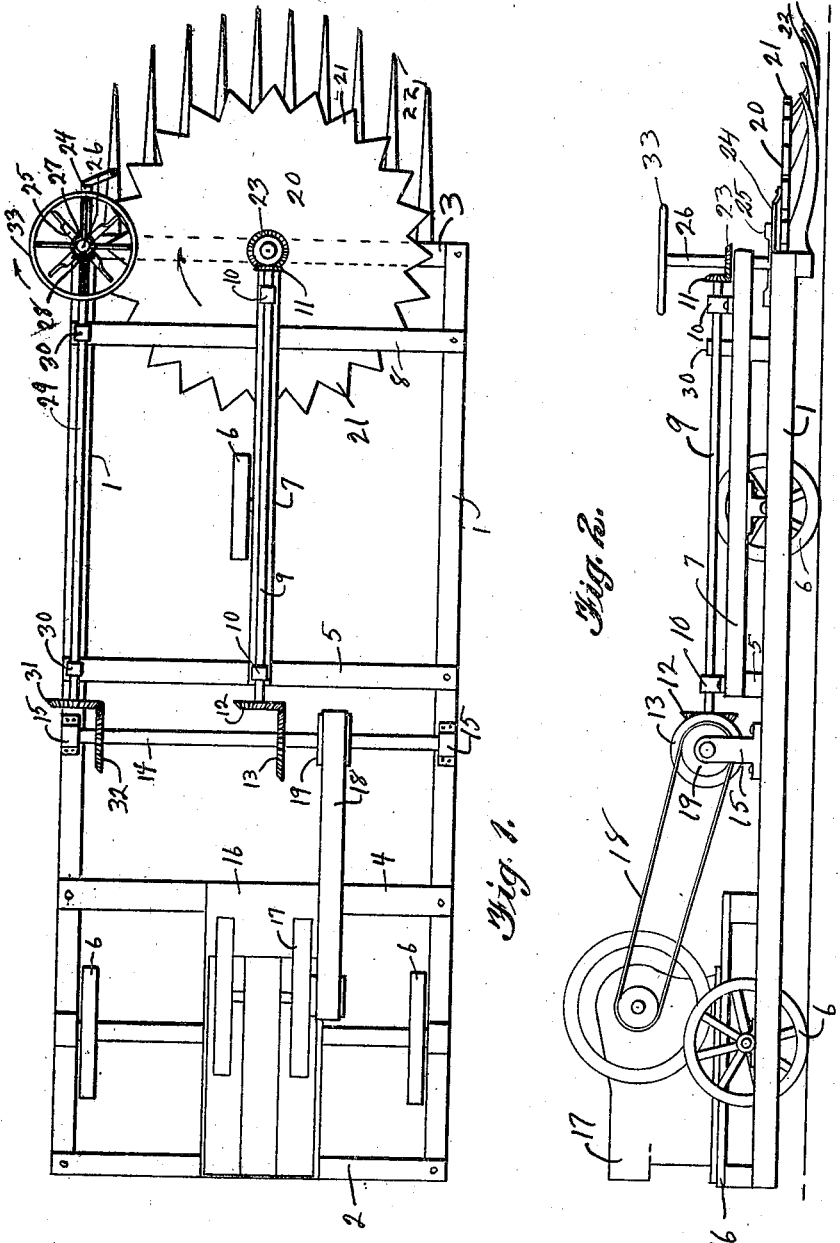

1,447,881

UNITED STATES PATENT OFFICE.

JENS V. NIELSEN, OF MILWAUKEE, WISCONSIN.

MOWING MACHINE.

Application filed December 9, 1920. Serial No. 429,378.

*To all whom it may concern:*

Be it known that I, JENS V. NIELSEN, a subject of the King of Denmark, residing at Milwaukee, in the county of Milwaukee and State of Wisconsin, have invented certain new and useful Improvements in a Mowing Machine, of which the following is a specification.

It has been found extremely difficult to use an ordinary mowing device close to a fence and as it is necessary to mow the weeds along the fences before the grain is cut, this work has heretofore been mostly done with a scythe which consumes considerable time and labor. It is the object of the present invention to provide a mowing device which may be efficiently used along a fence having means thereon for preventing the cutting mechanism from engaging the fence or fence post.

Another object of the invention is to provide a mowing machine with a main cutting mechanism and an auxiliary cutting mechanism disposed to one side thereof and in the corner of the machine provided with a wheel disposed thereover which will engage the fence and prevent the auxiliary cutting mechanism from coming into engagement therewith.

A still further object of the invention is to generally improve upon mowing machines by providing a machine which will be of extremely simple, durable and inexpensive construction, one which is efficient and reliable in operation and well adapted to the purpose for which it is designed.

With these and numerous other objects in view, the invention resides in certain novel features of construction and the combination and arrangement of parts as will be hereinafter fully described and claimed.

In the drawing:—

Figure 1 is a top plan view of the mowing machine,

Figure 2 is a side elevational view thereof, and

Figure 3:
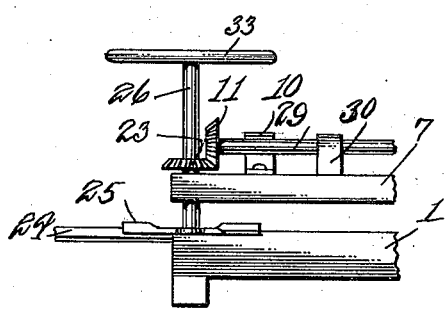
Figure 3 is a side elevation of the forward portion of the mowing machine showing the side opposite that shown in Fig. 2.

Referring to the drawing in detail it will be seen that the frame consists of two parallel longitudinal beams 1 which are connected with the cross beams 2 and 3 at their ends and also the cross beams 4 and 5 intermediate their ends. Suitable wheels 6 are provided and this mowing machine is preferably pushed by a tractor but of course any other suitable traction means may be used.

A beam 7 is disposed between the intermediate beams 5 and 8 and supports a shaft extending longitudinally thereof as indicated at 9. This shaft 9 is suitably mounted in journals 10 and is provided at its forward end with the beveled gear 11 and at its rear end with the beveled gear 12. The beveled gear 12 is in mesh with a beveled gear 13 keyed to the shaft 14 which is suitably mounted in journals 15 carried on the side beams 1. A platform 16 is mounted on the beams 2 and 4 and supports an engine of any preferred construction as indicated at 17 and power from this engine is transmitted through a belt 18 to the pulley 19 keyed to the shaft 14.

The main cutting mechanism consists of circular cutting wheel 20 which is provided with teeth 21 which pass over the guide fingers 22. As shown in Figure 2 these guide fingers 22 are curved so that their forward ends extend upwardly and will thus ride easily along the ground when they come into contact therewith. These guide fingers have the usual function of keeping the grain upright and in a position to be easily cut by the circular cutting blade 20. This circular cutting blade 20 is suitably journalled on the front cross beam 3 and a beveled gear 23 is fixed thereto so as to be in mesh with the beveled gear 11 and thus the circular cutting blade 20 will be rotated through the intermediacy of the shaft 9, shaft 14, and engine 17.

An auxiliary cutting mechanism is provided which is preferably disposed in the forward left-hand corner of the frame and includes the fixed cutting knife 24 which extends in alignment with the cross beam 1. The rotating cutting mechanism consists of a plurality of radiating cutting knives 25 suitably mounted on the shaft 26 which extends upright and has keyed thereto a beveled gear 27 which is in mesh with a beveled gear 28 suitably keyed on the shaft 29 which in turn is mounted on the side beam 1 in suitable journals 30. A beveled gear 31 is fixed to the rear end of the shaft 29 and is in mesh with a beveled gear 32 keyed to the shaft 14 and thus it will be seen that the rotary knives 25 will be actuated through the intermediacy of the shafts 29 and 14. On the upper end of the shaft 26 a wheel is provided and acts as means for preventing the rotary knives 25 from coming into contact with the fence or other obstacles. This wheel 33 is preferably loosely mounted on the shaft 26 so as to rotate independently thereof.

From the above description it will be seen that this mowing mechanism may be pushed forwardly and that the engine 17 will actuate the rotary cutting knife 20 and the rotary cutting blades 25. The machine may be run along side of the fence so that the wheel 33 will be in engagement therewith and it will be seen that the rotary knives 25 will cut as close to the fence as is practicable. It will also be seen that when this wheel 33 engages a fence post it will throw the machine to one side thus efficiently protecting all parts thereof.

From the foregoing description, taken in connection with the accompanying drawings, the construction and operation of the device will be readily understood without a more extended explanation. As numerous changes in form, proportion and in the minor details of construction may be resorted to without departing from the spirit of this invention, I do not wish to be limited to the construction herein shown and described other than as claimed.

Having thus described my invention what I claim as new is:—

In combination, a frame, a rotary cutting mechanism mounted on the frame, and a wheel having a circumference larger than the circumference formed by the rotary cutting mechanism when in motion, said wheel being disposed adjacent said cutting mechanism for the purpose of preventing obstacles from coming into contact with the same.

In testimony whereof I affix my signature in presence of two witnesses.

JENS V. NIELSEN.

Witnesses:
 FRANK H. HANNAFORD,
 HELEN M. HRDINA.